United States Patent
Binder et al.

(10) Patent No.: US 11,437,771 B2
(45) Date of Patent: Sep. 6, 2022

(54) SLIP RING BODY

(71) Applicant: Flender GmbH, Bocholt (DE)

(72) Inventors: Herbert Binder, Neuburg (DE);
Robert Gruber, Ruhstorf (DE); Oliver Memminger, Neuburg a. Inn (DE);
Manuel Oberneder, Büchlberg (DE);
Klaus Schifferer, Neuhaus am Inn (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 17/272,073

(22) PCT Filed: Aug. 26, 2019

(86) PCT No.: PCT/EP2019/072673
§ 371 (c)(1),
(2) Date: Feb. 26, 2021

(87) PCT Pub. No.: WO2020/043648
PCT Pub. Date: Mar. 5, 2020

(65) Prior Publication Data
US 2022/0094126 A1 Mar. 24, 2022

(30) Foreign Application Priority Data
Aug. 27, 2018 (EP) .................... 18190980

(51) Int. Cl.
*H01R 39/10* (2006.01)
*H01R 39/02* (2006.01)
*H02K 9/28* (2006.01)

(52) U.S. Cl.
CPC .......... *H01R 39/10* (2013.01); *H01R 39/025* (2013.01); *H02K 9/28* (2013.01)

(58) Field of Classification Search
CPC ...... H01R 39/10; H01R 39/025; H01R 39/08; H01R 39/085; H01R 39/34; H01R 39/045;
(Continued)

(56) References Cited

U.S. PATENT DOCUMENTS 1,580,530 A * 4/1926 Rambo .................. H01R 39/08
310/232
3,508,097 A * 4/1970 Zuck, Jr. ................ H01R 39/34
310/232

(Continued)

FOREIGN PATENT DOCUMENTS

DE 1488655 A1 9/1969
EP 3145059 A1 3/2017
(Continued)

*Primary Examiner* — Ahmed Elnakib
(74) *Attorney, Agent, or Firm* — Henry M. Feiereisen LLC (57) ABSTRACT

A slip ring body for electrically contacting an asynchronous machine includes first and second slip rings rigidly connected to one another, with at least two conductor bars fastened to each of the slip rings. At least one of the slip rings has a recess for passage of the conductor bars of the other slip ring and defining around the recess a first region in which air is at least partially present and which has a magnetic conductivity that is lower than a magnetic conductivity in a second region in which the conductor bars to the one slip ring are fastened, or which second region is embodied for contacting with an energy-transmitting brush. The first and second regions are not made of copper. The recess defines an opening cross-sectional area which is greater than a cross-sectional area of the conductor bars fastened to the one slip ring.

20 Claims, 6 Drawing Sheets

(58) Field of Classification Search
CPC ........ H02K 9/28; H02K 13/003; H02K 13/02; H02H 3/165; H02H 3/385; H02H 3/422; Y02E 10/72
USPC .......................................................... 310/232
See application file for complete search history.

(56) References Cited

U.S. PATENT DOCUMENTS

| | | | |
|---|---|---|---|
| 3,548,232 | A | 12/1970 | Foerste et al. |
| 4,410,821 | A * | 10/1983 | Kurt .................. H02K 9/28 310/227 |
| 9,806,482 | B2 | 10/2017 | Angerpointner et al. |
| 2012/0270415 | A1 * | 10/2012 | Lenker .................. H01R 43/10 29/874 |
| 2018/0131149 | A1 * | 5/2018 | Binder .................. H02H 3/165 |

FOREIGN PATENT DOCUMENTS

| | | |
|---|---|---|
| EP | 3179577 A1 | 6/2017 |
| WO | WO 2016165939 A1 | 10/2016 |

* cited by examiner

FIG 1

PRIOR ART

SLIP RING BODY

CROSS-REFERENCES TO RELATED APPLICATIONS

This application is the U.S. National Stage of International Application No. PCT/EP20191072673, filed Aug. 26, 2019, which designated the United States and has been published as International Publication No. WO 20201043648 A1 and which claims the priority of European Patent Application, Serial No. 18190980.5, filed Aug. 27, 2018, pursuant to 35 U.S.C. 119(a) (d).

BACKGROUND OF THE INVENTION

The invention relates to a slip ring body for electrically contacting an asynchronous machine as claimed in claim 1. In addition, the invention relates to an electric machine, in particular an asynchronous machine, with a slip ring body as claimed in claim 8. Furthermore, the invention relates to a use of a slip ring body for electrically contacting an asynchronous machine as claimed in claim 9.

In doubly fed asynchronous machines, a three-phase current system is impressed in the rotor. For current transmission purposes, a slip ring transmitter made of an electrically and magnetically conductive material, in particular stainless steel, is used. In such a slip ring transmitter, the three-phase current system is transmitted to slip rings and thus to the rotating part of the machine via stationary brushes. Here, the three-phase current system has to be conducted from the slip rings to the rotor winding of the rotor via corresponding conductor bars.

In this context, the conductor bars through which the three-phase current flows induce electrical eddy currents in adjacent, magnetically conductive materials, which in turn lead to a heating of the respective components due to ohmic losses. As the temperature of the components is not permitted to exceed certain values owing to the materials involved, it has been necessary until now to ensure a sufficient discharging of the heat power loss and therefore to ensure a cooling of the components in question.

Figure 1:
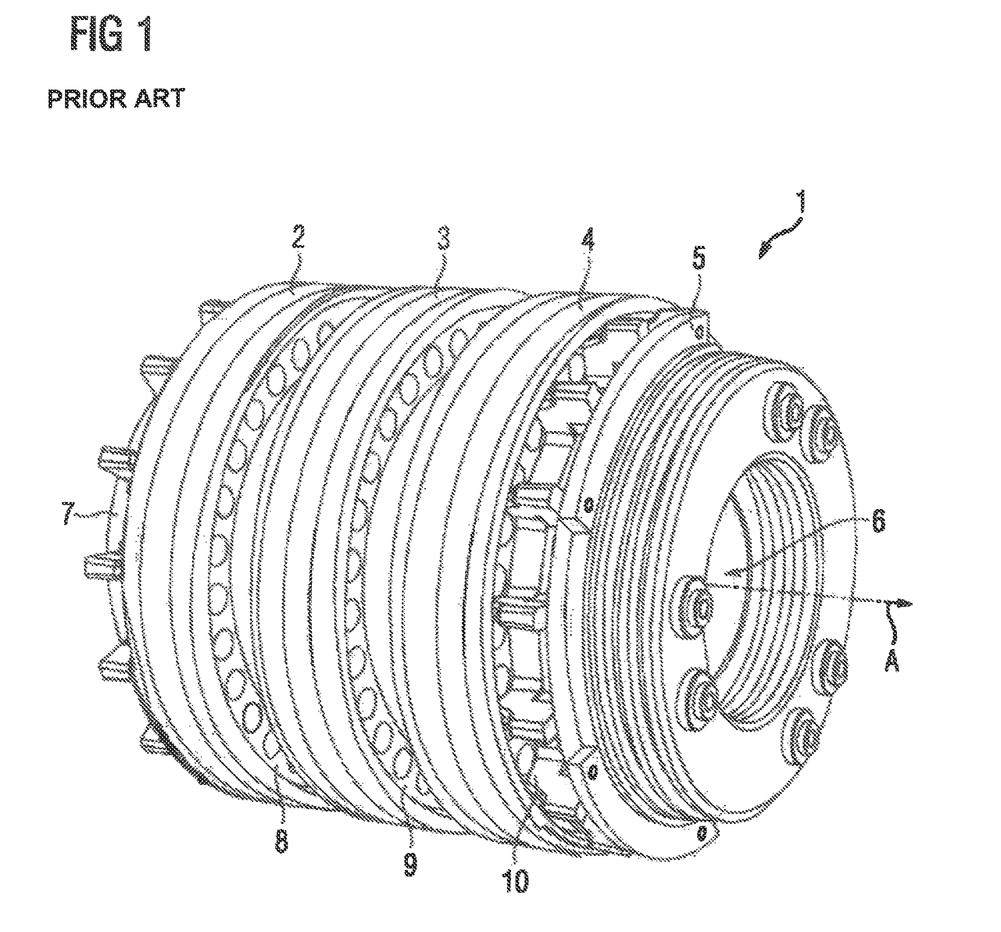
FIG. 1 shows a slip ring body according to the prior art.

FIG. 1 shows an example of a slip ring body 1 according to the prior art. The slip ring body comprises three slip rings 2, 3, 4 and a support ring 5. The three slip rings 2, 3, 4 are arranged along a (notional) axis of rotation A and have a recess lying radially on the inside that serves as a hub 6. A rotor axis (not shown) of an asynchronous machine can be guided within the hub 6.

The individual slip rings 2, 3, 4 are in each case surrounded by insulating bodies 7, 8, 9, 10 in the axial direction, which electrically insulate the slip ring bodies 2, 3, 4 from one another. Arranged at an axial end of the slip ring body 1 is the support ring 5, which is connected to the individual slip rings 2, 3, 4 and the insulating bodies 7, 8, 9, 10 by means of connecting means (e.g. bolts) which are not shown, in order to provide the slip ring body 1 with the necessary stability.

Figure 2:
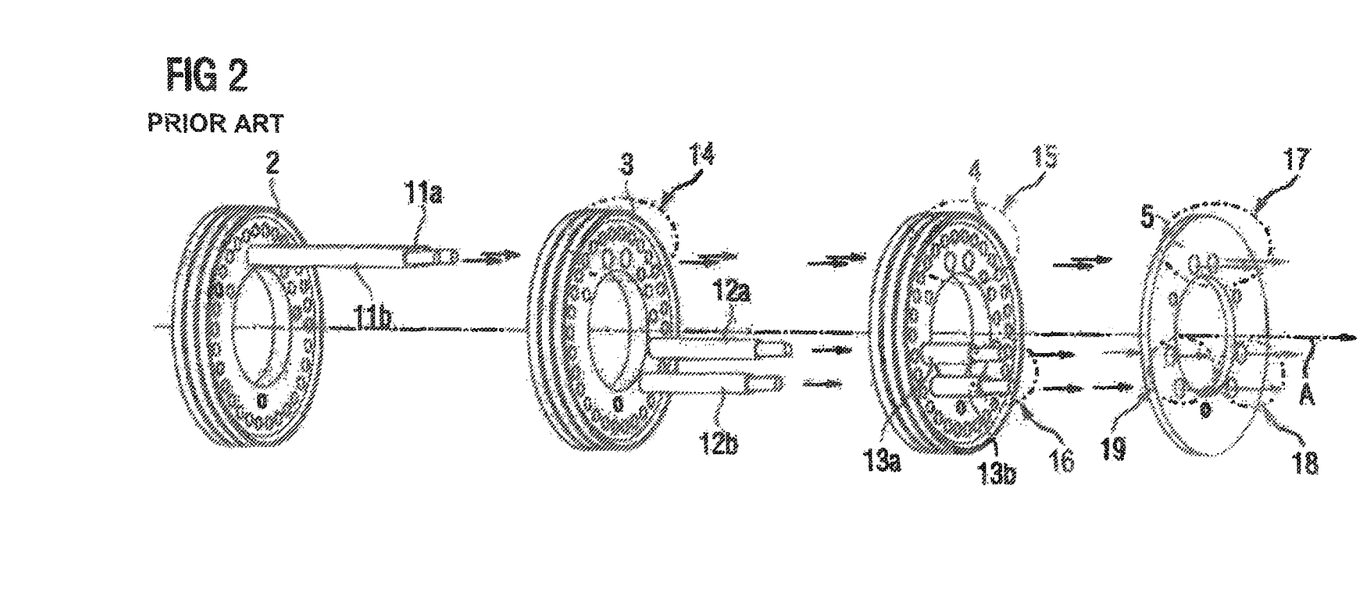
FIG. 2 shows the development in principle of heat loss in a slip ring body.

The development of the heat loss is explained on the basis of FIG. 2. Here, the three slip rings 2, 3, 4 are shown, of which in each case two conductor bars 11a, 11b, 12a, 12b, 13a, 13b lead out from the slip rings 2, 3, 4 in the axial direction. Starting from the slip ring 2 shown on the left in FIG. 2, the two associated conductor bars 11a, 11b lead in the axial direction A through corresponding (pairs of) recesses 14 in the slip ring 3 arranged further to the right in the axial direction in FIG. 2. Due to induced eddy currents, heat losses occur in the region of the recess 14. Looking from the second slip ring 3, four conductor bars 11a, 11b, 12a, 12b are already extending in the direction of the third slip ring 4. There, they are guided through corresponding (pairs of) recesses 15, 16 and in turn generate heat losses there. Six conductor bars 11a, 11b, 12a, 12b, 13a, 13b are guided through the support ring 5 and generate an accordingly high power loss in three (pairs of) recesses 17, 18, 19.

SUMMARY OF THE INVENTION

The approximate course of the conductor bars 11a, 11b, 12a, 12b, 13a, 13b is indicated by arrows in FIG. 2 for reasons of clarity, while the region of the recesses 14, 15, 16, 17, 18, 19 is marked by elliptical borders.

A different phase of the three-phase current system is regularly guided over each slip ring 2, 3, 4.

To date, it has been known to compensate for the developing losses via an improved cooling effect. To this end, however, elaborate cooling concepts are required, which, depending on a power of the motor to be supplied, may even be an active forced ventilation of the slip ring body. This is associated with high costs on the one hand and high technical requirements for the heat management on the other hand. In order to avoid or reduce the development of the eddy current losses, materials such as copper may also be used for the slip rings. These are characterized by a comparatively low magnetic conductivity, which limits the development of eddy currents. The costs of copper, however, are several orders of magnitude higher than those for stainless steel, which makes solutions of this kind less appealing from an economic perspective.

A slip ring body for electrically contacting an asynchronous machine is disclosed in WO 2016/165939 A1.

The object underlying the invention is that of specifying a slip ring body for electrically contacting an asynchronous machine, which avoids the previously explained disadvantages and is primarily characterized by being less elaborate, both from a technical and financial perspective.

This object is achieved by a slip ring body for electrically contacting an asynchronous machine as set forth hereinafter.

The slip ring body according to the invention comprises at least a first slip ring and a second slip ring. At least two conductor bars are fastened to both slip rings in each case. The at least two slip rings are rigidly connected to one another. At least one of the slip rings has at least one recess, which is embodied for guiding through the conductor bars of the at least one other slip ring. In other words, the slip ring body is embodied such that the conductor bars that are fastened to a slip ring pass through the other slip ring. This is not the case in the reverse direction.

The slip ring body according to the invention is characterized in that the at least one slip ring, which has the recess (for guiding through the conductor bars of the other slip ring), in a region around the recess has a lower magnetic conductivity than in a region in which the respective at least two conductor bars are fastened to it, wherein both regions are not manufactured from copper.

The slip rings have an annular shape, i.e. they are hollow on the inside and have a defined annular width. They are used to transmit electrical energy of a static supply system to a rotating part (rotor) of an asynchronous machine. In this context, the transmission takes place as a rule by means of (contact) brushes made of carbon, which are guided along a surface of the slip rings and in doing so transmit electrical energy to the slip rings.

A conductor bar is understood to mean a bar-shaped, current-conducting conductor which may be embodied in the form of a cylinder for example. Usually, the conductor bars inserted into slip ring bodies are rigid, so that they are unable to warp or bend during a rotary movement of the rotor of the asynchronous machine, in order to possibly cause a short circuit as a result. The conductor bars may be made of copper, for example, without being limited to this.

As known from the prior art, a slip ring body for example has two slip rings, which are spaced apart from one another and are electrically isolated from one another by means of insulators. Two conductor bars are fastened to one of the slip rings and two further conductor bars are fastened to the other of the two slip rings. All four conductor bars extend in the same direction. In order for the first two conductor bars to be able to pass the other slip ring, it has a specific recess or passage. In the prior art, these involve bores as a rule, through which the conductor bars are guided.

It is significant for the invention that a region around the at least one recess in at least one of the slip rings has a magnetic conductivity that is proportionally lower. The low magnetic conductivity (also referred to as magnetic permeability) reduces an intensity of the eddy currents induced around the conductor bars through which current flows in the crossed slip rings. This enables heat losses to be considerably reduced.

The proportion relates to a region of the slip rings in which the associated conductor bars are fastened thereto in each case. In this (transition) region, a high electrical conductivity is necessary, which as a rule can only be realized in a cost-effective manner using a material that likewise possesses a high magnetic conductivity. For this reason, stainless steel will regularly be used as material for the slip rings or the (transition) region of the slip rings between slip ring and conductor bar.

As already mentioned, in the prior art copper is also used as material for both regions (fastening region and passage region of the conductor bars). This is several orders of magnitude more expensive, however, for which reason the invention describes a solution for the problem given above, in which copper is not used in these regions in particular.

In the context of a development of the invention, air is at least partially in the region around the recess in the slip ring. In this context, the term "air" substantially refers to the natural gas mixture on earth. In the context of this development, the recess may be widened in such a manner that the eddy currents induced by the conductor bars are considerably lower than in the case of the "bores" known in the prior art, the opening cross-section of which is usually only slightly larger than that of the conductor bars. Preferably, an opening cross-sectional area of the recess is at least twice as large as a cross-sectional area of the conductor bars, particularly preferably at least four times as large.

However, a type of "air gap" may also be present in the region around the recess. In other words, in this context the recess for the conductor bars in the slip ring is not closed to its full extent, but rather it has an interruption, in which there is air. As a result, the annular magnetic field lines extending around the conductor bars experience an attenuation, which in turn reduces the development of eddy currents and thus of heat loss.

Alternatively, the reduced magnetic conductivity may also be achieved by a part of the region around the recess being omitted, i.e. air. In this context, the remaining part of the slip ring in this region is realized with a reduced material thickness, which reduces the magnetic conductivity of the region in question in total compared to the region around the fastenings of the conductor bars, in which the slip ring has a full material thickness.

Preferably, in this context the slip ring body is embodied in an annular manner and has an outer annular region with a higher material thickness and an inner annular region with a lower material thickness, wherein the at least one recess is arranged in the inner annular region.

As part of an advantageous development of the invention, the conductor bars hi a region where they are guided through the at least one recess are surrounded by an electrically insulating material in the radial direction. Here, in turn, the electrically insulating material is surrounded by a material that has a comparatively high electrical conductivity. The material with effective electrical conductivity surrounds the insulation layer and the actual conductor bar in the manner of a sleeve in this context.

Through the use of a material with effective electrical conductivity, such as copper or aluminum for example, eddy currents are induced in the sleeve which generate a magnetic field oriented in the inverse direction and confine (or screen) the magnetic field that is generated by the conductor bars through which current is flowing. The magnetic flux therefore only penetrates into the surrounding slip ring material to a lesser extent and generates accordingly lower heat losses.

Particularly preferably, a sleeve that surrounds a hub of the slip ring body is arranged in a radially inner region of the slip rings. In this context, the sleeve has a comparatively high electrical conductivity, wherein the sleeve in particular is manufactured from copper or aluminum. The hub itself may advantageously be made of a material with a comparatively low magnetic conductivity. For more detailed statements, reference is made to the description of the exemplary embodiments.

The object is additionally achieved by an electrical machine, in particular asynchronous machine, with a slip ring body according to the explanations above.

Furthermore, the object is achieved through the use of a slip ring body according to the explanations above for electrically contacting an asynchronous machine.

BRIEF DESCRIPTION OF THE DRAWING

The above-described characteristics, features and advantages of this invention, as well as the manner in which these are realized, will become clearer and more readily understandable in connection with the following description of the exemplary embodiments, which are explained in more detail in conjunction with the drawing, in which.

DETAILED DESCRIPTION OF PREFERRED EMBODIMENTS

Figure 3:
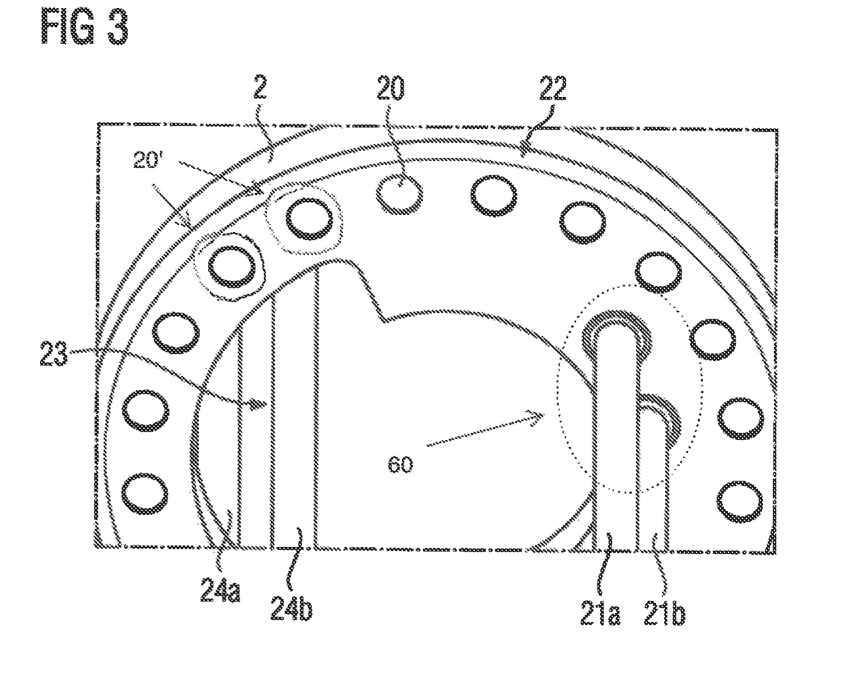
FIG. 3 shows a slip ring body according to the invention in accordance with a first embodiment.

FIG. 3 shows a slip ring 2 of a slip ring body 1 according to the invention in an oblique view. The slip ring 2 is embodied as a hollow cylinder and has ventilation holes 20 distributed over its perimeter that are used for passive heat dissipation of the slip ring 2 when the slip ring 2 is made to rotate, FIG. 3 also shows 20' in the upper left corner of FIG. 3 deepened parts around two of the recesses 20 that are incorporated leading to a smaller thickness than other parts of the silo ring 2. The deepened part is illustrated such that the smaller thickness can be seen at least at the outer rim of the slip ring 2.

Two conductor bars 21a, 21b are fastened to the slip ring 2 in a region 60. The fastening may be implemented by means of screwing or pressing the conductor bars 21a, 21b to or into the slip ring 2, for example. The conductor bars 21a, 21b are used for transmitting energy from an outer side 22 of the slip ring 2 to an electric machine (not shown), in particular asynchronous machine. The electrical energy is transmitted to the slip ring 2 via its outer side 22 by means of (carbon) brushes that are likewise not shown. In the present exemplary embodiment, the slip ring 2 is manufactured from stainless steel.

The slip ring 2 has a recess 23 offset in the circumferential direction in relation to the two conductor bars 21a, 21b. Guided through this recess 23 are two further conductor bars 24a, 24b that are not in contact with the slip ring 2, not even by means of a sleeve or the like. An opening cross-sectional area of the recess 23 is more than twice as large as a cross-sectional area of the two further conductor bars 24a, 24b. As can be seen from FIG. 3, ordinary air, which has a comparatively low magnetic conductivity, is situated in the region of the recess 23 around the conductor bars 24a, 24b. This causes the development of eddy currents around the conductor bars 24a, 24b guided through the recess 23 to be reduced, which brings lower heat losses.

Figure 4:
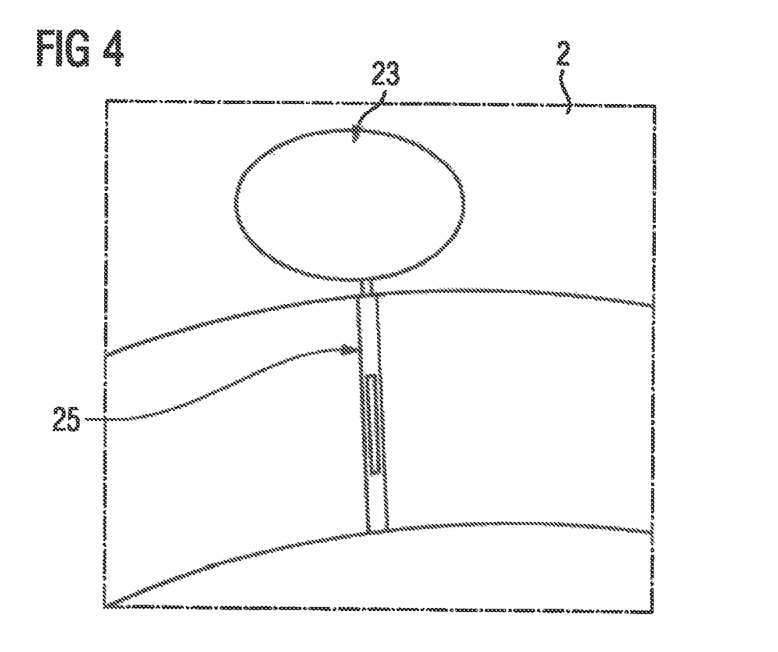
FIG. 4 shows a slip ring body according to the invention in accordance with a second embodiment.

FIG. 4 shows an alternative embodiment of a slip ring 2 of a slip ring body 1 according to the invention. The slip ring 2 has a recess 23 in the form of a "bore", the opening cross-sectional area of which is somewhat larger than a cross-sectional area of the conductor bars to be guided through it. In a region around the recess 23, the slip ring 2 has a slot-shaped opening 25. This interrupts a wall of the recess 23 and represents a local reduction of the magnetic conductivity at this point. This causes the magnetic field lines developing around the conductor bars to be attenuated, which in turn reduces the eddy current losses.

Figure 5:
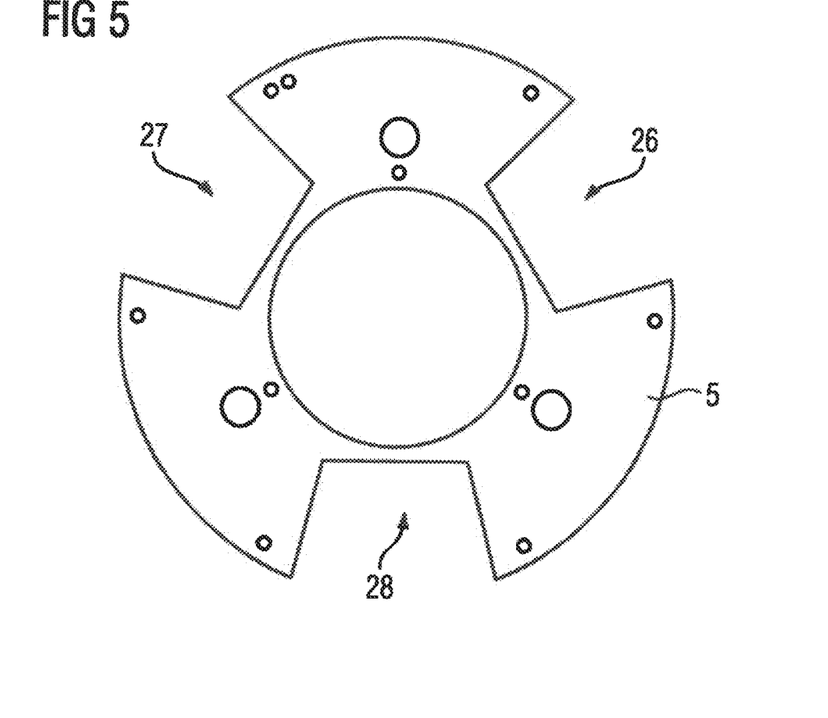
FIG. 5 shows a support ring for the slip ring body according to the invention in accordance with FIG. 4.
Figure 6:
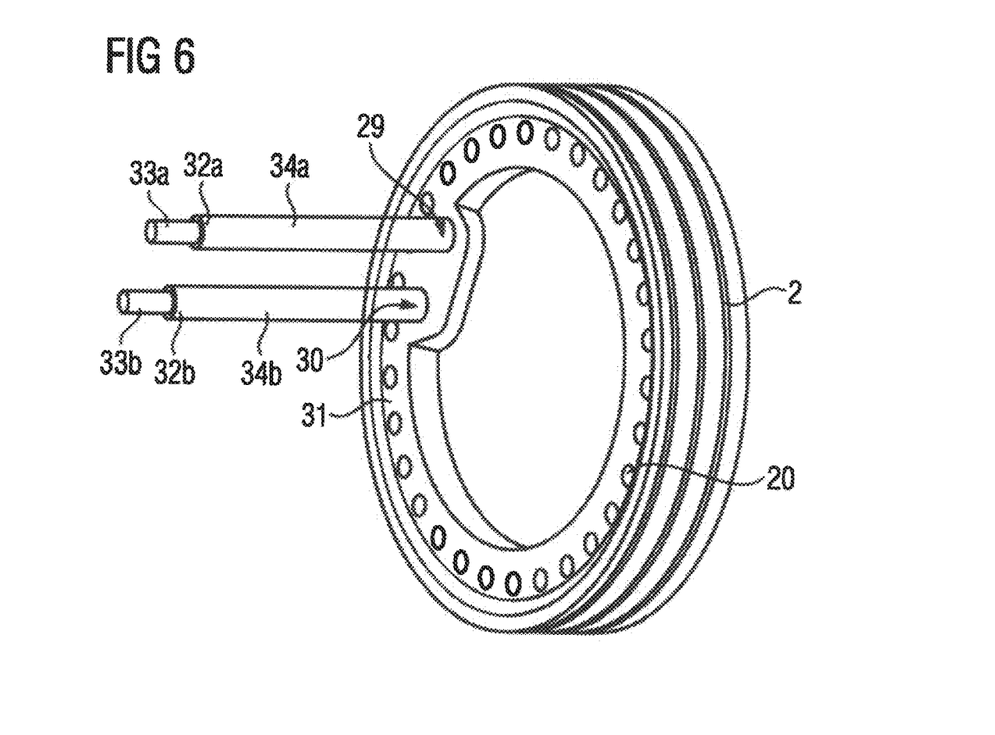
FIG. 6 shows a slip ring body according to the invention in accordance with a third embodiment.

In FIG. 5, a support ring 5 is shown which can be used, for example, in combination with slip rings 2 in accordance with FIGS. 3 and 4 in a slip ring body 1. The support ring 2 has three recesses 26, 27, 28 that open toward an outer perimeter of the annular slip ring 2. Through these recesses 26, 27, 28, it is possible for conductor bars to be guided that, due to the comparatively large opening cross-sectional area of the recesses 26, 27, 28, only induce low eddy currents in the support ring 5, FIG. 6 shows a further alternative embodiment of a slip ring 2 of a slip ring body 1 according to the invention.

The slip ring 2 is embodied as a hollow cylinder and has ventilation holes 20 distributed over its perimeter that are used for passive heat dissipation of the slip ring 2 when the slip ring 2 is made to rotate.

The slip ring 2 has two recesses 29, 30 that are arranged on a part 31 of the slip ring that protrudes radially inward. A conductor bar 34a, 34 is guided through the two recesses 29, 30 in each case. The conductor bars 34a, 34 each possess an electrically conductive core 33a, 33b (e.g. made of copper) lying on the inside and an enveloping insulating layer 32a, 32b lying on the outside that surrounds the core 33a, 32b lying on the inside. No material is situated in a region around the recesses 29, 30 or the protruding part 31, meaning that the magnetic conductivity is significantly reduced here.

A plurality of slip rings 2, the protruding parts 31 of which are displaced in relation to one another hi the circumferential direction, may be arranged in the slip ring body 1. This makes it possible in a simple manner to realize a sufficient distance between the (more than two) conductor bars 34a, 34b and avoid (electromagnetic) interactions that are subject to loss between the conductor bars 34a, 34b.

Figure 7:
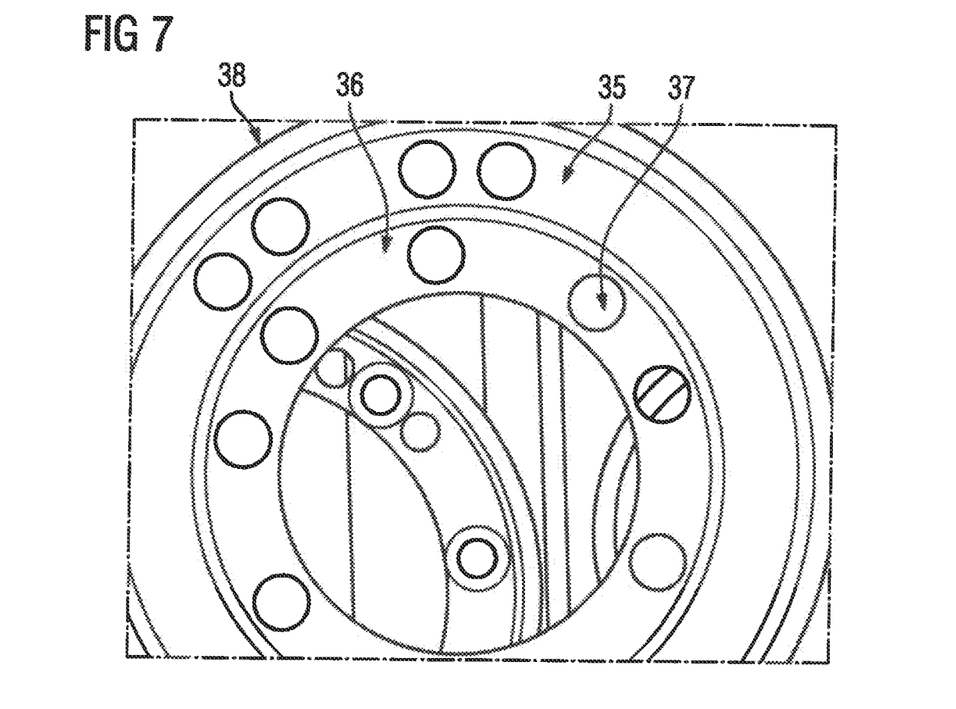
FIG. 7 shows a slip ring body according to the invention in accordance with a fourth embodiment.

A further exemplary embodiment can be found in FIG. 7. Here, a slip ring 2 is shown in a front view. The slip ring 2 has an outer annular region 35 and an inner annular region 36. The two annular regions 35, 36 are separated by means of a dashed line in FIG. 7 for illustration purposes. Arranged in the inner annular region 36 are "bore-shaped" recesses 37 for guiding through conductor bars. Regions of the slip ring 2 around the respective recesses have a lower magnetic conductivity than in an outer region 38 of the slip ring 2. This may be achieved, for example, by a material thickness of the slip ring 2 in the inner annular region 36 being lower than in the outer annular region 35. As an alternative or in addition, a material can be used for the inner annular region 35 which has a comparatively low magnetic conductivity. For example, the outer annular region 35 may be made of stainless steel and the inner annular region 36 may be made of aluminum or copper.

Figure 8:
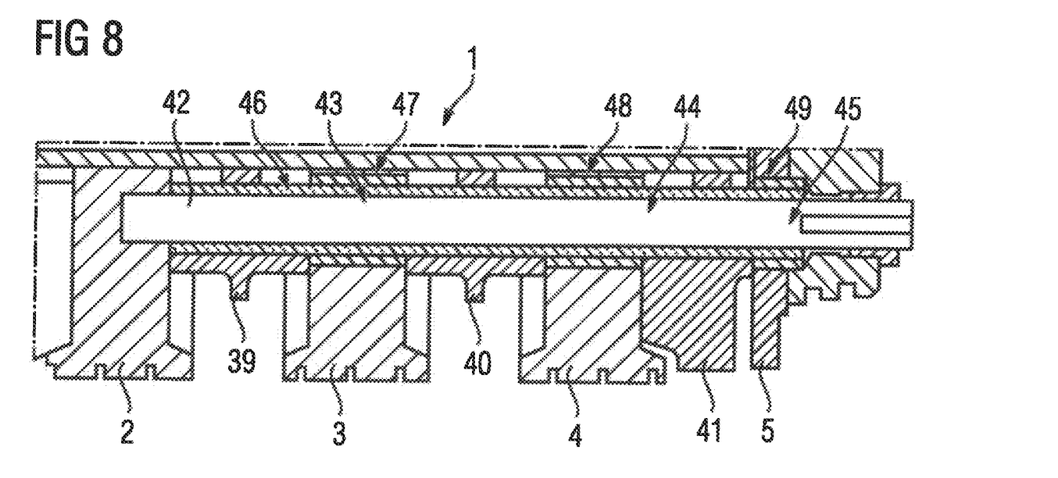
FIG. 8 shows a slip ring body according to the invention in accordance with a fifth embodiment in a longitudinal section.

FIG. 8 shows a further embodiment of a slip ring body 1 according to the invention in a longitudinal section. The slip ring body 1 has a first slip ring 2, a second slip ring 3, a third slip ring 4 and a support ring 5 (viewed from left to right in FIG. 8). Insulators 39, 40, 41 are attached between the slip rings 2, 3, 4 in order to electrically insulate the slip rings 2, 3, 4 from one another.

Fastened to the first slip ring 2 are two conductor bars 42, of which only one can be seen in FIG. 8. The conductor bar 42 extends from the first slip ring 2, proceeding in the axial direction, through corresponding recesses 43, 44, 45 in the two other slip rings 3, 4 and the support ring 5. The conductor bars 42 are enveloped by an insulation layer 46 that electrically isolates the conductor bars 42 from the surrounding parts of the slip ring body 1, in particular the slip rings 3, 4 and the support ring 5. In the region of the recesses 43, 44, 45, the insulation layer 46 is surrounded by sleeves 47, 48, 49 that consist of a material with a high electrical conductivity, but a low magnetic conductivity, in particular aluminum. In these sleeves 47, 48, 49, an electrical current is induced that in turn generates a magnetic field surrounding it, which is able to attenuate or screen the magnetic field around the conductor bars 42 through which current is flowing.

Figure 9:
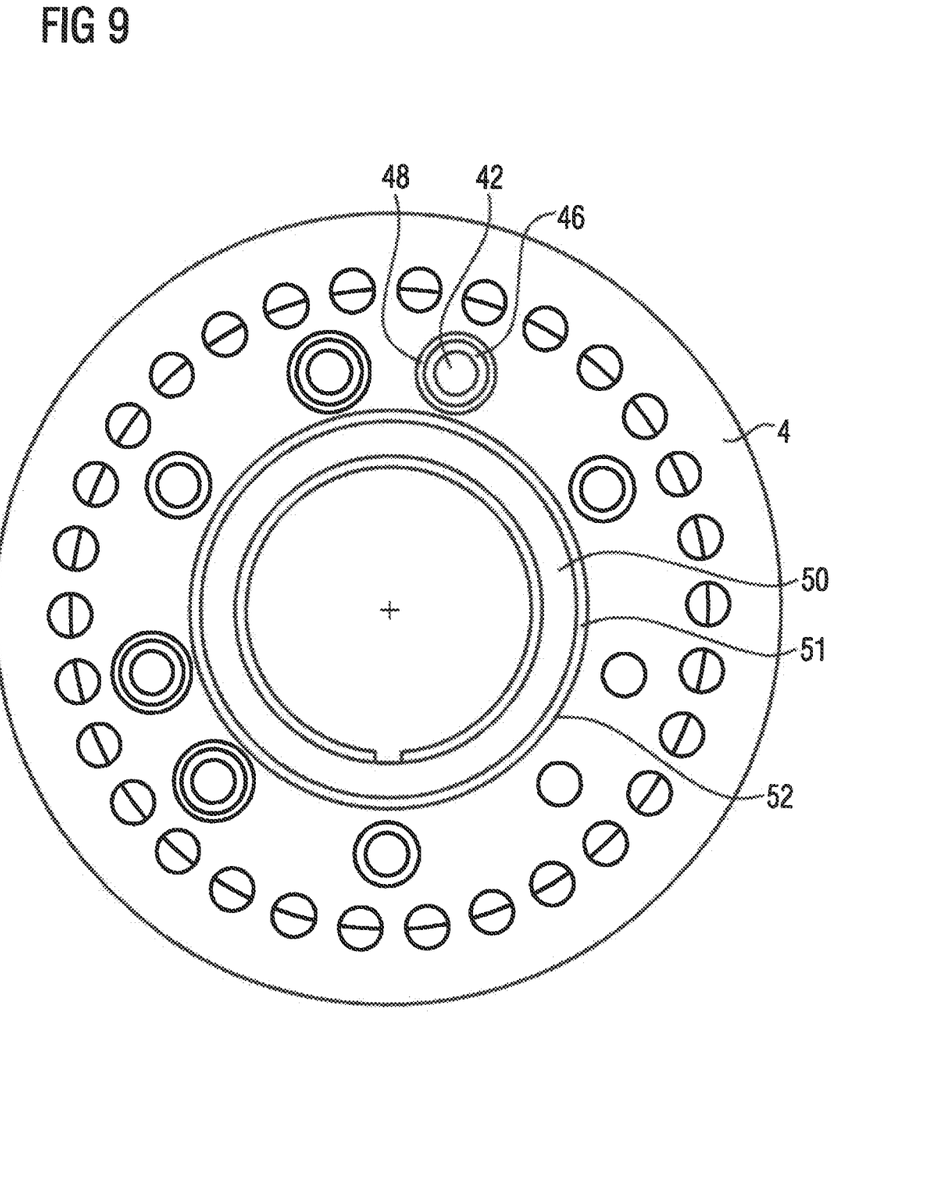
FIG. 9 shows the slip ring body in accordance with FIG. 8 in a cross-section.

FIG. 9 shows a front view of the slip ring 4 in accordance with FIG. 8. Arranged in an inner edge region of the slip ring 4 is an annular hub 50, which consists of a material with a low magnetic conductivity. An (electrical) insulating layer 51 is arranged around the hub 50. This insulating layer 51 is surrounded by a sleeve 52, which consists of a material with effective electrical conductivity, but low magnetic conductivity. By way of this embodiment of the slip ring 4, which of course is not limited to this one slip ring 4, the advantages explained on the basis of FIG. 8 are further amplified.

Although the invention has been illustrated and described in detail by the preferred exemplary embodiments, the invention is not restricted by the examples disclosed and other variations can be derived therefrom by a person skilled in the art without departing from the protective scope of the invention.

The invention claimed is:

1. A slip ring body for electrically contacting an asynchronous machine, said slip ring body comprising:
   first and second slip rings rigidly connected to one another; and
   at least two conductor bars fastened to the first slip ring and at least two conductor bars fastened to the second slip ring;
   wherein at least one of the first and second slip rings has a recess for passage of the conductor bars of the other one of the first and second slip rings,
   at least one of the first and second slip rings defining around the recess a first region which has a magnetic conductivity that is lower than a magnetic conductivity in a second region in which the conductor bars to the one of the first and second slip rings are fastened, or the second region is embodied for contacting with an energy-transmitting brush, said first and second regions being made in the absence of copper,
   said at least one of the first and second slip rings having in the first region around the recess an axial material thickness which is lower than an axial material thickness in other regions of the one of the first and second slip rings.

2. The slip ring body of claim 1, wherein the other regions include an outer annular region and the first region includes an inner annular region, said recess being arranged in the inner annular region.

3. The slip ring body of claim 1, further comprising an electrically insulating material placed in radially surrounding relation to the conductor bars in a region where the conductor bars are guided through the recess, and a material placed in surrounding relation to the electrically insulating material and having an electrical conductivity which is higher than an electrical conductivity of the electrically insulating material.

4. The slip ring body of claim 1, further comprising:
   a hub; and
   a sleeve placed in surrounding relation to the hub and arranged in a radially inner region of at least one of the first and second rings, said sleeve having a high electrical conductivity.

5. The slip ring body of claim 4, wherein the sleeve is manufactured from aluminum.

6. The slip ring body of claim 4, wherein the hub is made of a material of low magnetic conductivity.

7. An electric machine, comprising a slip ring body as set forth in claim 1.

8. The electric machine of claim 7, wherein the other regions include an outer annular region and the first region includes an inner annular region, said recess being arranged in the inner annular region.

9. The electric machine of claim 7, wherein the one of the first and second slip rings includes an electrically insulating material placed in radially surrounding relation to the conductor bars in a region where the conductor bars are guided through the recess, and a material placed in surrounding relation to the electrically insulating material and having an electrical conductivity which is higher than an electrical conductivity of the electrically insulating material.

10. The electric machine of claim 7, wherein the one of the first and second slip rings includes a hub, and a sleeve placed in surrounding relation to the hub and arranged in a radially inner region of at least one of the first and second rings, said sleeve having a high electrical conductivity.

11. The electric machine of claim 10, wherein the sleeve is manufactured from aluminum.

12. The electric machine of claim 10, wherein the hub is made of a material of low magnetic conductivity.

13. The electric machine of claim 7, wherein the electric machine comprises an asynchronous machine.

14. A slip ring body for electrically contacting an asynchronous machine, said slip ring body comprising:
   first and second slip rings rigidly connected to one another; and
   at least two conductor bars fastened to the first slip ring and at least two conductor bars fastened to the second slip ring,
   wherein at least one of the first and second slip rings has a recess for passage of the conductor bars of the other one of the first and second slip rings,
   at least one of the first and second slip rings defining around the recess a first region in which air is at least partially present and said first region has a magnetic conductivity that is lower than a magnetic conductivity in a second region in which the conductor bars to the one of the first and second slip rings are fastened, or the second region is embodied for contacting with an energy-transmitting brush, said first and second regions being made in the absence of copper,
   said recess defining an opening cross-sectional area which is greater than a cross-sectional area of the conductor bars fastened to the one of the first and second slip rings.

15. The slip ring body of claim 14, wherein the opening cross-sectional area of the recess is sized twice as large as the cross-sectional area of the conductor bars fastened to the one of the first and second slip rings.

16. The slip ring body of claim 14, wherein the opening cross-sectional area of the recess is sized four times as large as the cross-sectional area of the conductor bars fastened to the one of the first and second slip rings.

17. An electric machine, comprising a slip ring body, said slip ring body comprising first and second slip rings rigidly connected to one another, and at least two conductor bars fastened to the first slip ring and at least two conductor bars fastened to the second slip ring, wherein at least one of the first and second slip rings has a recess for passage of the conductor bars of the other one of the first and second slip rings, at least one of the first and second slip rings defining around the recess a first region in which air is at least partially present and said first region has a magnetic conductivity that is lower than a magnetic conductivity in a second region in which the conductor bars to the one of the first and second slip rings are fastened, or the second region is embodied for contacting with an energy-transmitting brush, said first and second regions being made in the absence of copper, said recess defining an opening cross-sectional area which is greater than a cross-sectional area of the conductor bars fastened to the one of the first and second slip rings.

18. The electric machine of claim 17, wherein the opening cross-sectional area of the recess is sized twice as large as the cross-sectional area of the conductor bars fastened to the one of the first and second slip rings.

19. The electric machine of claim 17, wherein the opening cross-sectional area of the recess is sized four times as large as the cross-sectional area of the conductor bars fastened to the one of the first and second slip rings.

20. The electric machine of claim 17, wherein the electric machine comprises an asynchronous machine.

* * * * *